US012352444B2

(12) United States Patent
Shershnyov

(10) Patent No.: US 12,352,444 B2
(45) Date of Patent: Jul. 8, 2025

(54) COMBUSTOR NOZZLE, COMBUSTOR, AND GAS TURBINE INCLUDING SAME

(71) Applicant: DOOSAN ENERBILITY CO., LTD., Changwon-si (KR)

(72) Inventor: Borys Shershnyov, Changwon-si (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/642,430

(22) Filed: Apr. 22, 2024

(65) Prior Publication Data

US 2024/0410583 A1 Dec. 12, 2024

(30) Foreign Application Priority Data

May 2, 2023 (KR) ........................ 10-2023-0057295

(51) Int. Cl.
*F23R 3/28* (2006.01)

(52) U.S. Cl.
CPC .............. *F23R 3/286* (2013.01); *F23R 3/283* (2013.01); *F05D 2240/35* (2013.01); *F05D 2260/20* (2013.01)

(58) Field of Classification Search
CPC .......... F23D 14/02; F23D 14/62; F23D 14/64; F23D 2203/007; F23R 3/283; F23R 3/286
See application file for complete search history.

(56) References Cited

U.S. PATENT DOCUMENTS

| | | | |
|---|---|---|---|
| 8,438,851 | B1 | 5/2013 | Uhm et al. |
| 2010/0031662 | A1 | 2/2010 | Zuo |
| 2012/0031102 | A1 | 2/2012 | Uhm et al. |
| 2012/0192566 | A1 | 8/2012 | Uhm et al. |
| 2013/0086912 | A1 | 4/2013 | Berry |
| 2013/0104551 | A1 | 5/2013 | Uhm et al. |
| 2013/0318976 | A1 | 12/2013 | Melton et al. |
| 2017/0254539 | A1 | 9/2017 | Melton et al. |
| 2019/0056113 | A1 | 2/2019 | Mook et al. |

FOREIGN PATENT DOCUMENTS

| | | | |
|---|---|---|---|
| CN | 106523156 | A | 3/2017 |
| JP | 2013181744 | A | 9/2013 |
| JP | 6033457 | | 11/2016 |
| JP | 2020085284 | A | 6/2020 |
| KR | 20200027894 | A | 3/2020 |
| KR | 1021905370000 | | 12/2020 |
| KR | 20220014301 | A | 2/2022 |
| KR | 102382634 | | 4/2022 |
| KR | 20220104492 | A | 7/2022 |

OTHER PUBLICATIONS

Extended European Search Report received for European Application No. 24172973.0 mailed on Sep. 25, 2024, 8 pages.

*Primary Examiner* — Scott J Walthour
(74) *Attorney, Agent, or Firm* — SHOOK, HARDY & BACON L.L.P.

(57) ABSTRACT

A combustor nozzle, a combustor including the combustor nozzle, and a gas turbine including the combustor. The combustor nozzle may include a plurality of mixing tubes through which air and fuel flow, a multi-tube into which the mixing tubes are inserted, the multi-tube supporting the mixing tubes, a fuel tube formed inside the multi-tube and through which fuel flows, a tip plate coupled to a tip of the multi-tube, a front plate spaced apart from the tip plate, the front plate forming a cooling space, and a dispersion plate spaced apart from the front plate and connected to the fuel tube, the dispersion plate forming a dispersion space in which fuel discharged from the fuel tube is diffused.

20 Claims, 8 Drawing Sheets

COMBUSTOR NOZZLE, COMBUSTOR, AND GAS TURBINE INCLUDING SAME

CROSS REFERENCE TO RELATED APPLICATION

The present application claims priority to Korean Patent Application No. 10-2023-0057295, filed May 2, 2023, the entire contents of which are incorporated herein for all purposes by this reference.

BACKGROUND OF THE INVENTION

Field of the Invention

Exemplary embodiments relate to a combustor nozzle, a combustor, and a gas turbine including the same and, more particularly, to a combustor nozzle using fuel containing hydrogen, a combustor, and a gas turbine including the same.

Description of the Related Art

A gas turbine is a power engine that mixes air compressed by a compressor with fuel for combustion and rotates a turbine with hot gas produced by the combustion. The gas turbine is used to drive a generator, an aircraft, a ship, a train, and so on.

Generally, the gas turbine includes a compressor, a combustor, and a turbine. The compressor sucks and compresses outside air, and then transmits the compressed air to the combustor. The air compressed by the compressor becomes high pressure and high temperature. The combustor mixes the compressed air introduced from the compressor with fuel and burns a mixture thereof. Combustion gas produced by the combustion is discharged to the turbine. Turbine blades in the turbine are rotated by the combustion gas, thereby generating power. The generated power is used in various fields, such as generating electric power, actuating machines, and so on. Fuel is sprayed through nozzles mounted in each combustor, and the nozzles may be configured to spray gas fuel and liquid fuel. Recently, it is recommended to use hydrogen fuel or fuel containing hydrogen so as to inhibit the emission of carbon dioxide.

However, since hydrogen has a high combustion rate, when hydrogen fuel or fuel containing hydrogen is burned in a gas turbine combustor, a flame formed in the gas turbine combustor approaches and heats the structure of the gas turbine combustor, which may cause a problem with the reliability of the gas turbine combustor.

In order to solve this problem, Korean Patent Application Publication No. 10-2020-0027894 proposes a combustor nozzle having multiple tubes. However, since the nozzle having the multiple tubes is not provided with a swirler, there is a problem that it is difficult to uniformly mix fuel and air with each other.

In addition, in a gas turbine that burns hydrogen, it is necessary to efficiently cool a nozzle tip part in order to prevent deterioration of the nozzle tip part.

SUMMARY OF THE INVENTION

Aspects of one or more exemplary embodiments provide a combustor nozzle capable of efficiently cooling a nozzle tip part, a combustor, and a gas turbine including the same. In addition, aspects of one or more exemplary embodiments provide a combustor nozzle capable of uniformly mixing fuel and air, a combustor, and a gas turbine including the same. Additional aspects will be set forth in part in the description which follows and, in part, will become apparent from the description, or may be learned by practice of the exemplary embodiments.

According to an aspect of an exemplary embodiment, there is provided a combustor nozzle that burns fuel containing hydrogen, the combustor nozzle including: a plurality of mixing tubes through which air and fuel flow; a multi-tube into which the mixing tubes are inserted, the multi-tube supporting the mixing tubes; a fuel tube formed inside the multi-tube and through which fuel flows; a tip plate coupled to a tip of the multi-tube; a front plate spaced apart from the tip plate, the front plate forming a cooling space; and a dispersion plate spaced apart from the front plate and connected to the fuel tube, the dispersion plate forming a dispersion space in which fuel discharged from the fuel tube is diffused.

An impact connector may be mounted between the front plate and the tip plate, the impact connector connecting the dispersion space and the cooling space to each other, and the impact connector being configured to spray the fuel toward the tip plate such that the fuel impacts the tip plate.

A first end portion of the impact connector may be fixed to the tip plate, and a second end portion of the impact connector may be fixed to the front plate.

The impact connector may include a connection tube coupled to the front plate, a support protrusion that protrudes from the connection tube, and a heat transfer support which protrudes from the support protrusion and which is in contact with the tip plate.

The support protrusion may include a plurality of support protrusions that protrudes from the connection tube, and the plurality of support protrusions may be formed such that the plurality of support protrusions is inclined with respect to a longitudinal direction of the connection tube. The heat transfer support may be formed in a truncated cone shape such that an inner diameter of the heat transfer support is gradually increased from the support protrusion toward the tip plate. The support protrusion may be formed in a plate shape, and may be inserted into an inner portion of the connection tube, thereby dividing an inner space of the connection tube.

A recessed portion which is concavely recessed and which forms a stabilizing space having a cone shape may be formed in a center of the tip plate.

A plurality of intermediate spray holes through which the fuel is sprayed may be formed at a portion in the fuel tube positioned in the dispersion space.

A tip spray portion which protrudes in a cone shape and which has a plurality of tip spray holes may be formed on a tip of the fuel tube.

A center spray plate which is disposed inclinedly with respect to the front plate and which faces the recessed portion may be formed in a center of the front plate, and a center hole through which the fuel is sprayed may be formed in the center spray plate.

The dispersion plate may be formed such that the dispersion plate is inclined so that the dispersion plate gradually protrudes rearward from a center of the dispersion plate in a radial direction toward an outside thereof.

According to an aspect of another exemplary embodiment, there is provided a combustor including: a burner having a nozzle that includes a plurality of nozzles configured to spray fuel and air; and a duct assembly which is coupled to a first side of the burner and in which the fuel and the air are burned, the duct assembly being configured to transfer combustion gas to a turbine, wherein the nozzle includes: a plurality of mixing tubes through which air and fuel flow; a multi-tube into which the mixing tubes are inserted, the multi-tube supporting the mixing tubes; a fuel tube formed inside the multi-tube and through which fuel flows; a tip plate coupled to a tip of the multi-tube; a front plate spaced apart from the tip plate, the front plate forming a cooling space; and a dispersion plate spaced apart from the front plate and connected to the fuel tube, the dispersion plate forming a dispersion space in which fuel discharged from the fuel tube is diffused.

An impact connector may be mounted between the front plate and the tip plate, the impact connector connecting the dispersion space and the cooling space to each other, and the impact connector being configured to spray the fuel toward the tip plate such that the fuel impacts the tip plate.

The impact connector may include a connection tube coupled to the front plate, a support protrusion that protrudes from the connection tube, and a heat transfer support which protrudes from the support protrusion and which is in contact with the tip plate.

A plurality of intermediate spray holes through which the fuel is sprayed may be formed at a portion in the fuel tube positioned in the dispersion space.

A tip spray portion which protrudes in a cone shape and which has a plurality of tip spray holes may be formed on a tip of the fuel tube.

According to an aspect of still another exemplary embodiment, there is provided a gas turbine including: a compressor configured to compress air introduced from outside; a combustor configured to mix fuel with air compressed from the compressor, the combustor being configured to burn a mixture of the fuel and the air; and a turbine that includes a plurality of turbine blades configured to be rotated by combustion gas generated from the combustor, wherein the combustor includes: a burner having a nozzle that includes a plurality of nozzles configured to spray fuel and air; and a duct assembly which is coupled to a first side of the burner and in which the fuel and the air are burned, the duct assembly being configured to transfer the combustion gas to the turbine, and wherein the nozzle includes: a plurality of mixing tubes through which air and fuel flow; a multi-tube into which the mixing tubes are inserted, the multi-tube supporting the mixing tubes; a fuel tube formed inside the multi-tube and through which fuel flows; a tip plate coupled to a tip of the multi-tube; a front plate spaced apart from the tip plate, the front plate forming a cooling space; and a dispersion plate spaced apart from the front plate and connected to the fuel tube, the dispersion plate forming a dispersion space in which fuel discharged from the fuel tube is diffused.

An impact connector may be mounted between the front plate and the tip plate, the impact connector connecting the dispersion space and the cooling space to each other, and the impact connector being configured to spray the fuel toward the tip plate such that the fuel impacts the tip plate.

The impact connector may include a connection tube coupled to the front plate, a support protrusion that protrudes from the connection tube, and a heat transfer support which protrudes from the support protrusion and which is in contact with the tip plate.

As described above, in the combustor nozzle, the combustor, and the gas turbine according to an aspect of the present disclosure, since the fuel tube, the dispersion plate, and the front plate are provided, fuel supplied from the fuel tube is dispersed in the dispersion space, so that the fuel impact and is sprayed to the tip plate from the front plate, thereby being capable of efficiently cooling the tip part of the nozzle.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
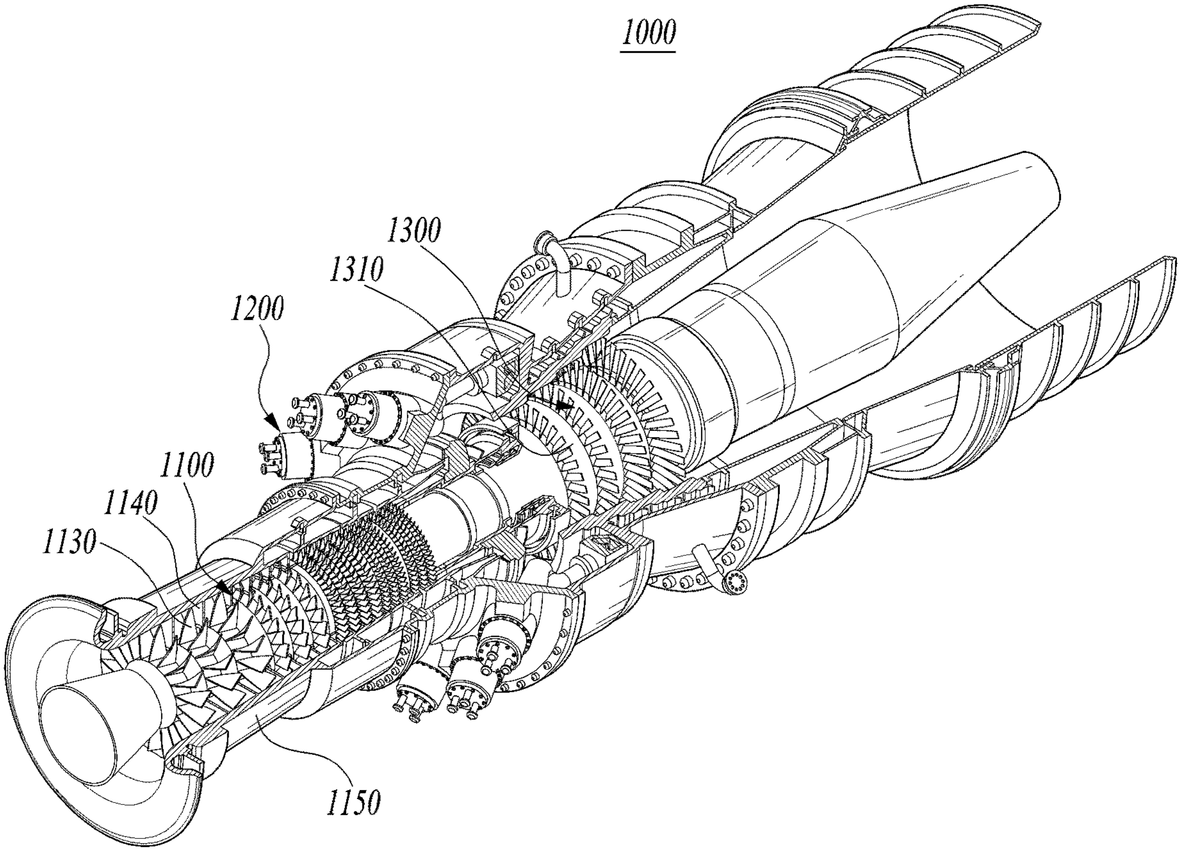
FIG. 1 is a view illustrating an interior of a gas turbine according to a first embodiment of the present disclosure.

Various modifications and different embodiments will be described below in detail with reference to the accompanying drawings so that those skilled in the art can easily carry out the present disclosure. It should be understood, however, that the present disclosure is not intended to be limited to the specific embodiments, but the present disclosure includes all modifications, equivalents or replacements that fall within the spirit and scope of the disclosure as defined in the following claims.

The terminology used herein is for the purpose of describing specific embodiments only and is not intended to limit the scope of the present disclosure. As used herein, the singular forms "a", "an", and "the" are intended to include the plural forms as well, unless the context clearly indicates otherwise. In the present disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Hereinafter, exemplary embodiments will be described below in detail with reference to the accompanying drawings. It should be noted that like reference numerals refer to like parts throughout various drawings and exemplary embodiments. In certain embodiments, a detailed description of functions and configurations well known in the art may be omitted to avoid obscuring appreciation of the present disclosure by those skilled in the art. For the same reason, some components may be exaggerated, omitted, or schematically illustrated in the accompanying drawings.

Hereinafter, a gas turbine according to a first embodiment of the present disclosure will be described.

Figure 2:
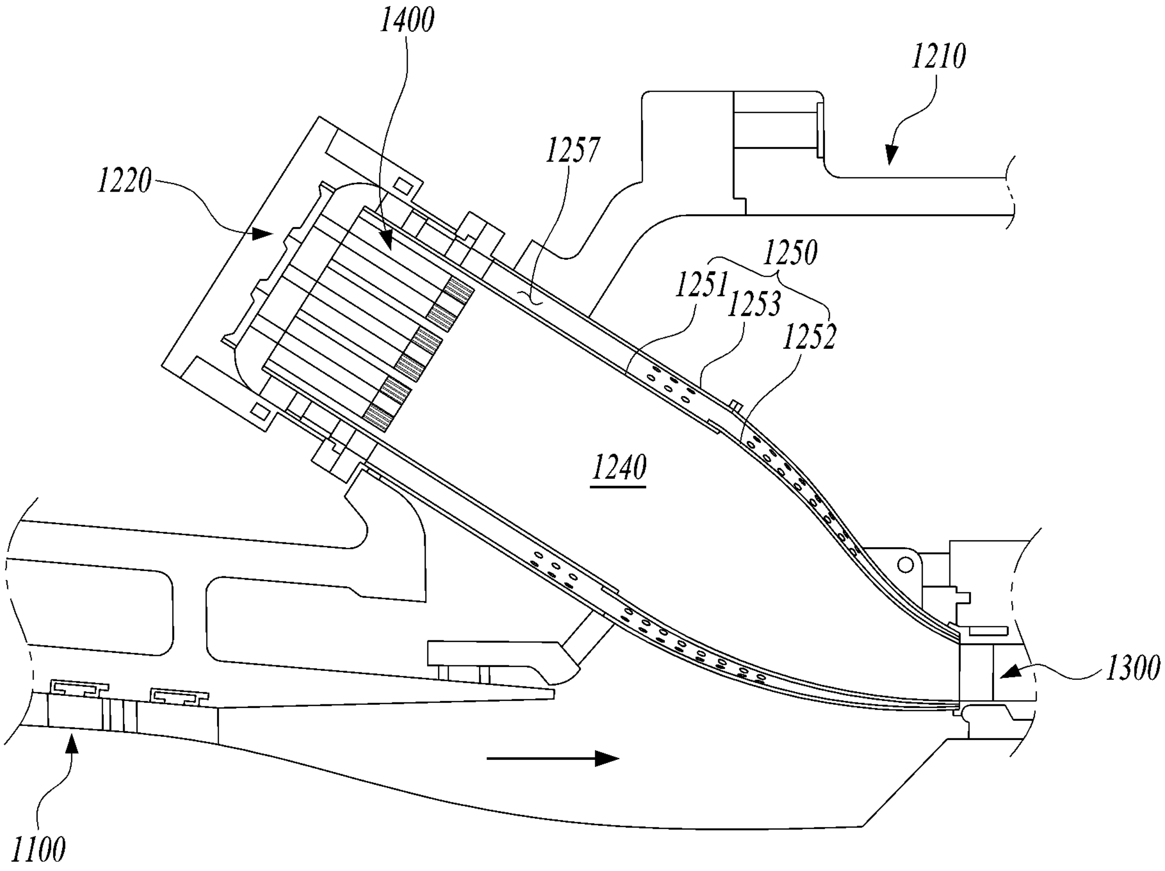
FIG. 2 is a view illustrating a combustor in FIG. 1.

FIG. 1 is a view illustrating an interior of the gas turbine according to the first embodiment of the present disclosure, and FIG. 2 is a view illustrating a combustor of FIG. 1.

A thermodynamic cycle of a gas turbine 1000 according to the present embodiment may ideally comply with the Brayton cycle. The Brayton cycle may consist of four phases including isentropic compression (adiabatic compression), isobaric heat addition, isentropic expansion (adiabatic expansion), and isobaric heat dissipation. In other words, in the Brayton cycle, thermal energy may be released by combustion of fuel in an isobaric environment after the atmospheric air is sucked and compressed to a high pressure, hot combustion gas may be expanded to be converted into kinetic energy, and exhaust gas with residual energy may then be discharged to the atmosphere. That is, the Brayton cycle may consist of four processes, i.e., compression, heating, expansion, and exhaust.

As illustrated in FIG. 1, the gas turbine 1000 using the Brayton cycle as described above may include a compressor 1100, a combustor 1200, and a turbine 1300. Although the following description is given with reference to FIG. 1, the description of the present disclosure may be widely applied to a turbine engine having the same configuration as the gas turbine 1000 exemplarily illustrated in FIG. 1.

Referring to FIG. 1, the compressor 1100 of the gas turbine 1000 may suck air from the outside and compress the air. The compressor 1100 may supply the air compressed by compressor blades 1130 to the combustor 1200, and may supply cooling air to a high temperature region required for cooling in the gas turbine 1000. In this case, since the air sucked into the compressor 1100 is subject to an adiabatic compression process in the compressor 1100, the pressure and temperature of the air that has passed through the compressor 1100 increase.

The compressor 1100 is designed as a centrifugal compressor or an axial compressor. Generally, the centrifugal compressor is applied to a small gas turbine, whereas a multistage axial compressor is applied to the large gas turbine 1000 as illustrated in FIG. 1 because it is necessary to compress a large amount of air. In the multistage axial compressor, the compressor blades 1130 of the compressor 1100 rotate along with a rotation of rotor disks to compress air introduced thereinto while delivering the compressed air to rear-stage compressor vanes 1140. The air is compressed increasingly to a high pressure while passing through the compressor blades 1130 formed in a multistage manner.

A plurality of compressor vanes 1140 may be formed in a multistage manner and mounted inside a housing 1150. The compressor vanes 1140 guide the compressed air that flows from front-stage compressor blades 1130 to rear-stage compressor blades 1130. In one embodiment, at least some of the plurality of compressor vanes 1140 may be mounted such that at least some of the plurality of compressor vanes 1140 is capable of being rotated within a fixed range for regulating an inflow rate of air and so on.

The compressor 1100 may be driven by using some of a power output from the turbine 1300. To this end, as illustrated in FIG. 1, a rotary shaft of the compressor 1100 and a rotary shaft of the turbine 1300 may be directly connected to each other. In the large gas turbine 1000, almost half of the power that is generated from the turbine 1300 may be consumed for driving the compressor 1100. Therefore, the overall efficiency of the gas turbine 1000 may be enhanced by directly increasing the efficiency of the compressor 1100.

The turbine 1300 includes a plurality of rotor disks 1310, a plurality of turbine blades radially arranged on each of the rotor disks 1310, and a plurality of turbine vanes. Each of the rotor disks 1310 has a substantially disk shape and has a plurality of grooves formed on an outer peripheral portion thereof. The grooves are formed such that each of the grooves has a curved surface, and the turbine blades and the turbine vanes are inserted into the grooves. The turbine vanes are fixed so as not to rotate and serve to guide a flow direction of combustion gas that has passed through the turbine blades. The turbine blades generate rotational force while being rotated by the combustion gas.

Meanwhile, the combustor 1200 may mix fuel with the compressed air that is supplied from an outlet of the compressor 1100 and perform isobaric combustion, thereby being capable of producing combustion gas with high energy. FIG. 2 is a view illustrating an example of the combustor 1200 applied to the gas turbine 1000. The combustor 1200 may include a combustor casing 1210, a burner 1220, a nozzle 1400, and a duct assembly 1250.

The combustor casing 1210 may have a substantially cylindrical shape such that the combustor casing 1210 surrounds a plurality of burners 1220. The burners 1220 may be disposed on a downstream end of the compressor 1100, and may be disposed along the combustor casing 1210 having an annular shape. Each of the burners 1220 includes a plurality of nozzles 1400, and fuel sprayed from the nozzles 1400 is mixed with air at an appropriate rate so that the mixture thereof is suitable for combustion.

The gas turbine 1000 may use gas fuel, especially fuel containing hydrogen. The fuel may be either hydrogen fuel alone or fuel containing hydrogen and natural gas.

Compressed air is supplied to the nozzles 1400 along an outer surface of the duct assembly 1250 that connects an associated one of the burners 1220 to the turbine 1300 so that hot combustion gas flows through the duct assembly 1250. In this process, the duct assembly 1250 heated by the hot combustion gas is properly cooled.

The duct assembly 1250 may include a liner 1251, a transition piece 1252, and a flow sleeve 1253. The duct assembly 1250 has a double structure in which the flow sleeve 1253 surrounds the liner 1251 and the transition piece 1252. The liner 1251 and the transition piece 1252 are cooled by the compressed air permeated into an annular space inside the flow sleeve 1253. The liner 1251 is a tubular member connected to the burner 1220 of the combustor 1200, and a space inside the liner 1251 forms a combustion chamber 1240. A first end portion of the liner 1251 in a longitudinal direction is coupled to the burner 1220, and a second end portion of the liner 1251 in the longitudinal direction is coupled to the transition piece 1252.

In addition, the transition piece 1252 is connected to an inlet of the turbine 1300 and serves to guide hot combustion gas to the turbine 1300. A first end portion of the transition piece 1252 in a longitudinal direction is coupled to the liner 1251, and a second end portion of the transition piece 1252 in the longitudinal direction is coupled to the turbine 1300. The flow sleeve 1253 serves to protect the liner 1251 and the transition piece 1252 while preventing high-temperature heat from being directly released to the outside.

Figure 3:
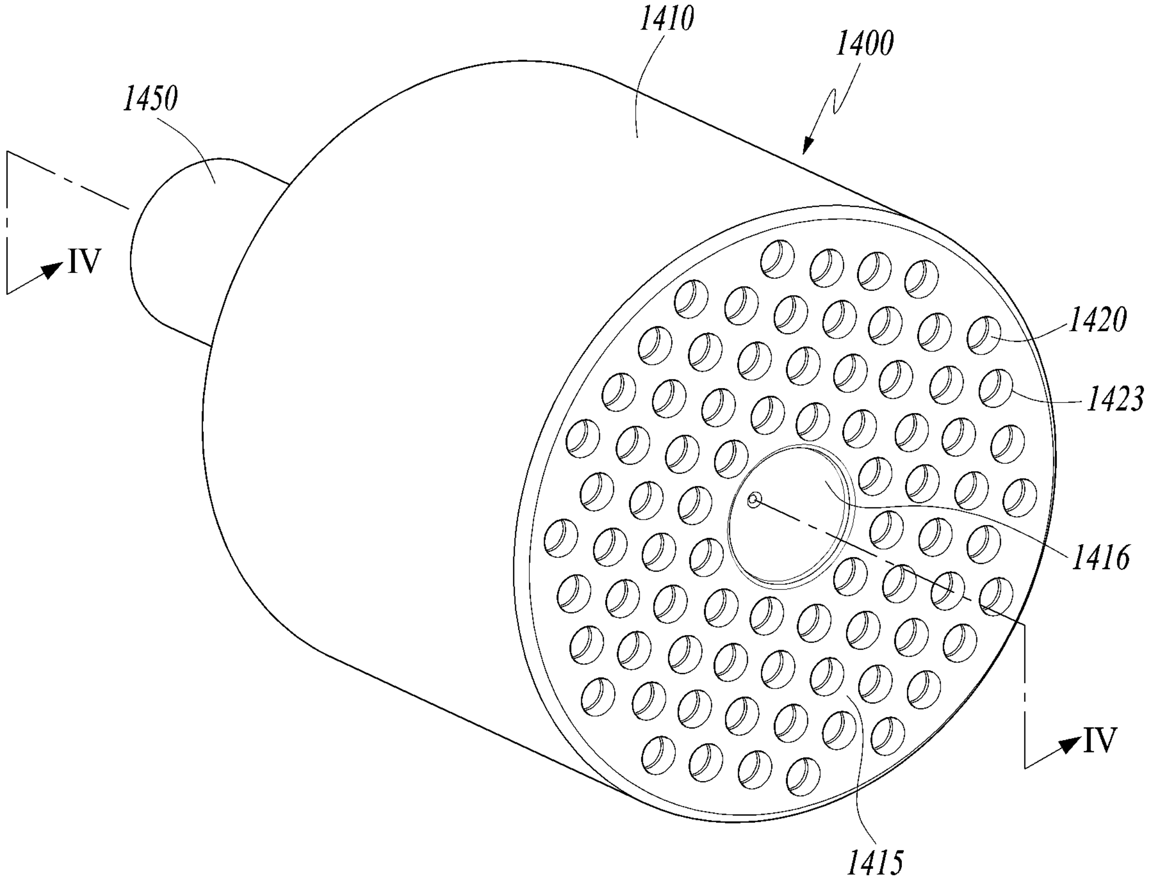
FIG. 3 is a perspective view illustrating a nozzle according to the first embodiment of the present disclosure.
Figure 4:
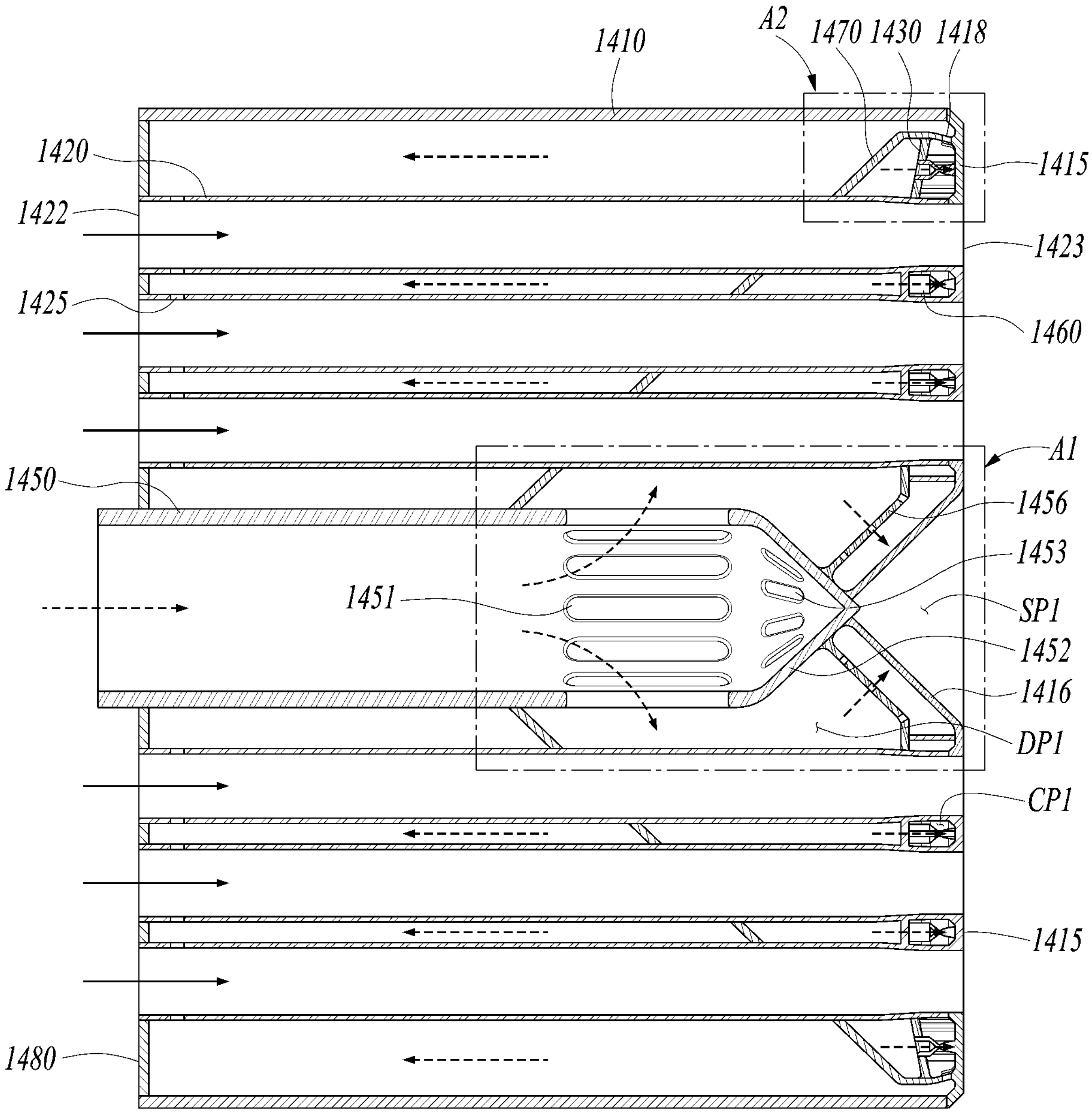
FIG. 4 is a cross-sectional view taken along line IV-IV in FIG. 3.
Figure 5:
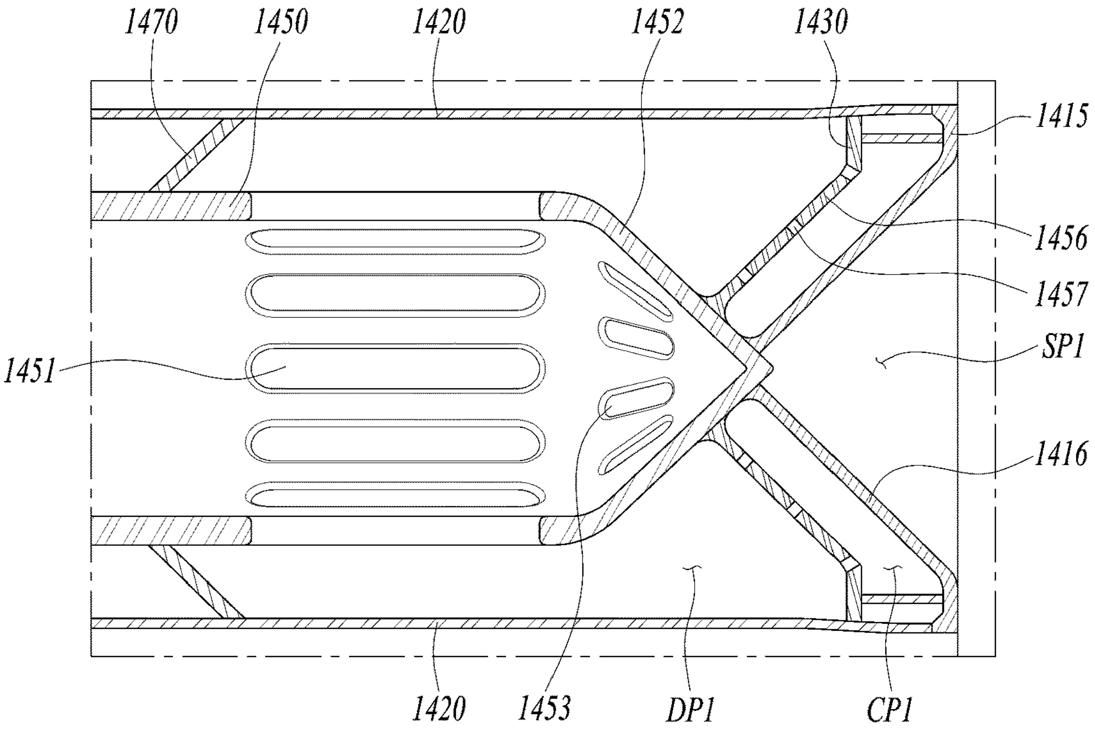
FIG. 5 is an enlarged view illustrating area A1 in FIG. 4.
Figure 6:
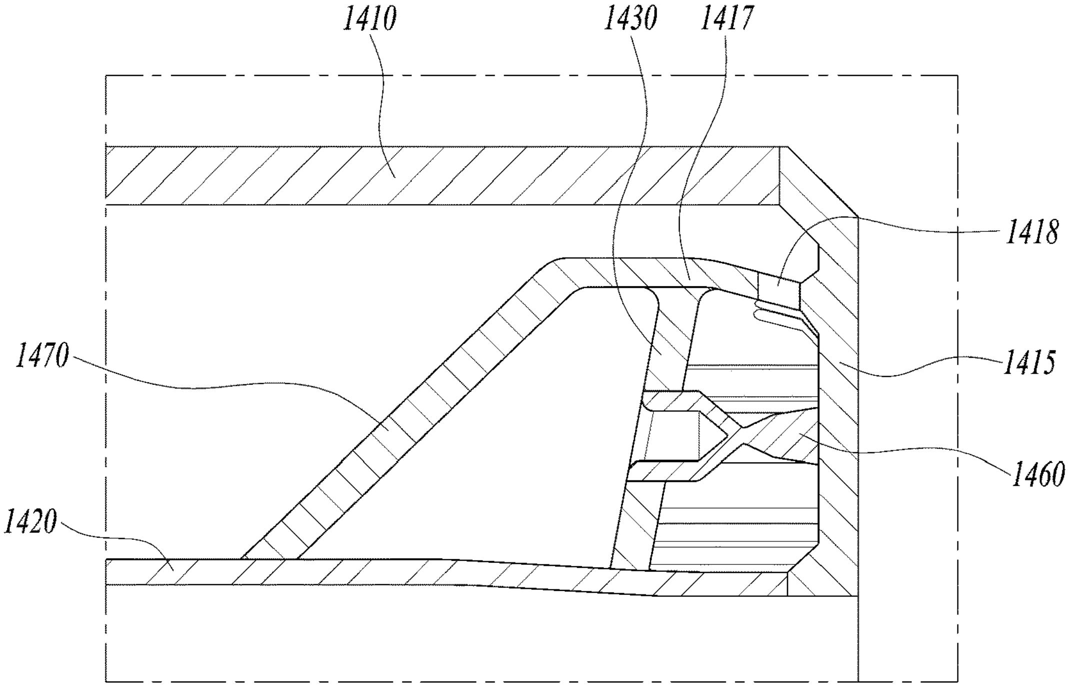
FIG. 6 is an enlarged view illustrating area A2 in FIG. 4.

FIG. 3 is a perspective view illustrating the nozzle according to the first embodiment of the present disclosure, FIG. 4 is a cross-sectional view taken along line IV-IV in FIG. 3, FIG. 5 is an enlarged view illustrating area A1 in FIG. 4, and FIG. 6 is an enlarged view illustrating area A2 in FIG. 4.

Referring to FIGS. 3 to 6, the nozzle 1400 may include a plurality of mixing tubes 1420 through which air and fuel flow, a multi-tube 1410 surrounding the mixing tubes 1420, a fuel tube 1450 formed inside the multi-tube 1410, a tip plate 1415 coupled to a tip of the multi-tube 1410, a front plate 1430 spaced apart from the tip plate 1415, and a dispersion plate 1470 spaced apart from the front plate 1430.

The multi-tube 1410 is formed in a cylindrical shape, and has a space formed therein. The fuel tube 1450 is disposed at a center of the multi-tube 1410 in a radial direction, and provides a space through which fuel flows. Here, the fuel may be gas containing hydrogen. The multi-tube 1410 may be configured to finely spray hydrogen and air. The fuel tube 1450 may protrude rearward (an upstream side) of the multi-tube 1410.

The fuel tube 1450 is connected to the dispersion plate 1470, and may supply fuel to a dispersion space DP1. An intermediate spray hole 1451 through which fuel is sprayed into the dispersion hole DP1 is formed in the fuel tube 1450. The intermediate spray hole 1451 is formed in a portion located in the dispersion space DP1 in the fuel tube 1450, and the plurality of intermediate spray holes 1451 may be spaced apart from each other in a circumferential direction of the fuel tube 1450. In addition, the intermediate spray hole 1451 may be formed along a longitudinal direction of the fuel tube 1450.

In addition, a tip spray portion 1452 which protrudes in a cone shape and which has a plurality of tip spray holes 1453 is formed on a tip (a tip at a downstream side) of the fuel tube 1450. The tip spray portion 1452 is formed in a structure in which an inner diameter is gradually decreased toward the downstream side, and the plurality of tip spray holes 1453 may be spaced apart from each other in a circumferential direction of the tip spray portion 1452. The tip spray portion 1452 is connected to a recessed portion 1416, and may support the recessed portion 1416. The tip plate 1415 is coupled to the tip of the multi-tube 1410, and forms a cooling space CP1. The tips of the plurality of the mixing tubes 1420 may be inserted into the tip plate 1415. The front plate 1430 is spaced apart from the tip plate 1415, and forms the cooling space CP1. The front plate 1430 may be fixed to the mixing tubes 1420.

The recessed portion 1416 which is concavely recessed and which forms a stabilizing space SP1 having a cone shape is formed in a center of the tip plate 1415. As the recessed portion 1416 is formed, a flame may be stabilized.

The front plate 1430 is spaced apart from the tip plate 1415 and forms the cooling space CP1, and a plurality of impact connectors 1460 may be mounted between the front plate 1430 and the tip plate 1415.

In the center of the front plate 1430 in the radial direction, a center spray plate 1456 disposed obliquely with respect to the front plate 1430 is formed. The center spray plate 1456 faces the recessed portion 1416, and may be formed in a substantially cone shape. A center hole 1457 through which fuel is sprayed is formed in the center spray plate 1456, and the fuel sprayed from the center hole 1457 may impact and cool the recessed portion 1416.

An intermediate tube 1417 is mounted on an outer end of the front plate 1430, and the intermediate tube 1417 is fixed to the outer end of the front plate 1430 and to an outer end of the dispersion plate 1470. In addition, a tip of the intermediate tube 1417 may be fixed to the tip plate 1415. A plurality of outer connection holes 1418 for moving fuel may be formed in the intermediate tube 1417.

The dispersion plate 1470 is spaced apart from the front plate 1430 toward the downstream side (rearward), and is connected to the fuel tube 1450 such that the dispersion space DP1 in which fuel discharged from the fuel tube 1450 is diffused is formed. The dispersion plate 1470 is formed such that a center portion of the dispersion plate 1470 protrudes further rearward than an outer side thereof, and may be formed obliquely such that the dispersion plate 1470 gradually protrudes rearward as the center portion approaches an inner side thereof from the outer side. The plurality of mixing tubes 1420 may be inserted into the front plate 1430 and the dispersion plate 1470.

Figure 7:
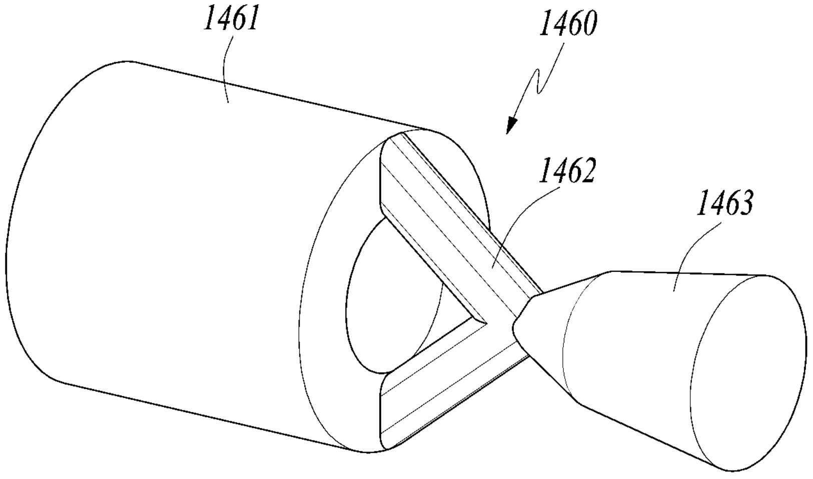
FIG. 7 is a perspective view illustrating an impact connector according to the first embodiment of the present disclosure.
Figure 8:
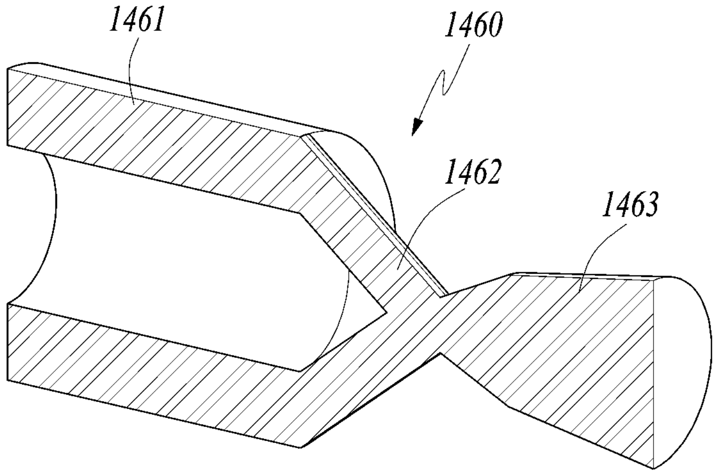
FIG. 8 is a cross-sectional view illustrating the impact connector according to the first embodiment of the present disclosure taken along in a longitudinal direction.

FIG. 7 is a perspective view illustrating an impact connector according to the first embodiment of the present disclosure, and FIG. 8 is a cross-sectional view illustrating the impact connector according to the first embodiment of the present disclosure taken along in a longitudinal direction.

Referring to FIGS. 6 to 8, the plurality of impact connectors 1460 supporting the tip plate 1415 is mounted between the front plate 1430 and the tip plate 1415. The impact connector 1460 connects the front plate 1430 and the tip plate 1415, and moves fuel in the dispersion space DP1 to the cooling space CP1. The fuel accommodated in the dispersion space DP1 may impact and cool the tip plate 1415 while moving to the cooling space CP1 through the impact connector 1460.

A first end portion of the impact connector 1460 may be fixed to the tip plate 1415, and a second end portion of the impact connector 1460 may be fixed to the front plate 1430. In addition, the impact connector 1460 receives heat in a conduction manner from the tip plate 1415, and may be cooled by fuel.

The impact connector 1460 may include a connection tube 1461 coupled to the front plate 1430, a supporting protrusion 1462 that protrudes from the connection tube 1461, and a heat transfer support 1463 which protrudes from the supporting protrusion 1462 and which is in contact with the tip plate 1415. The connection tube 1461 may be formed in a cylindrical shape, or may be formed in a structure in which an inner diameter gradually decreases toward the tip plate 1415. The plurality of support protrusions 1462 protrudes from the connection tube 1461, and is formed obliquely with respect to a longitudinal direction of the connection tube 1461. The plurality of support protrusions 1462 may be inclined from the connection tube 1461 toward a center of the connection tube 1461 in a radial direction. The heat transfer support 1463 may be formed in a truncated cone shape in which an inner diameter gradually increases from the support protrusion 1462 to the tip plate 1415.

During combustion, heat generated in the tip plate 1415 may be transferred to the support protrusion 1462 and the connection tube 1461 through the heat transfer support 1463, and the heat transfer support 1463 and the support protrusion 1462 may be cooled by fuel being sprayed. Accordingly, fuel introduced into the dispersion space DP1 through the intermediate spray hole 1451 and the tip spray hole 1453 is dispersed between the dispersion plate 1470 and the front plate 1430, and may impact and cool the tip plate 1415 through the impact connector 1460. Meanwhile, the fuel cooling the tip plate 1415 may be moved rearward (the downstream side with respect to a movement direction of air) through the outer connection hole 1418. A rear plate 1480 is coupled to a rear end (an upstream side) of the multi-tube 1410, and the plurality of mixing tubes 1420 is mounted inside the multi-tube 1410 so that several small flames can be formed by using hydrogen gas. The plurality of mixing tubes 1420 may be spaced apart from each other within the multi-tube 1410, and may be formed such that the plurality of mixing tubes 1420 is disposed parallel to each other. The mixing tube 1420 may be formed in a cylindrical shape.

A spray port 1423 through which air mixed with fuel is sprayed inside the combustor 1200 is formed on a front side of the mixing tube 1420, and an inlet port 1422 into which air is introduced is formed on a rear side of the mixing tube 1420. A plurality of fuel spray holes 1425 through which fuel is sprayed may be formed in the mixing tube 1420. Fuel moved rearward through the outer connection hole 1418 is sprayed inside the mixing tube 1420 through the fuel spray hole 1425, and may be mixed with air.

As in the embodiment, when the nozzle 1400 includes the dispersion plate 1470 and the impact connector 1460, fuel and air are uniformly mixed with each other, and components positioned on a front side of the nozzle 1400 are efficiently cooled, so that life and durability of the nozzle 1400 may be increased.

Hereinafter, the nozzle according to a second embodiment of the present disclosure will be described.

Figure 9:
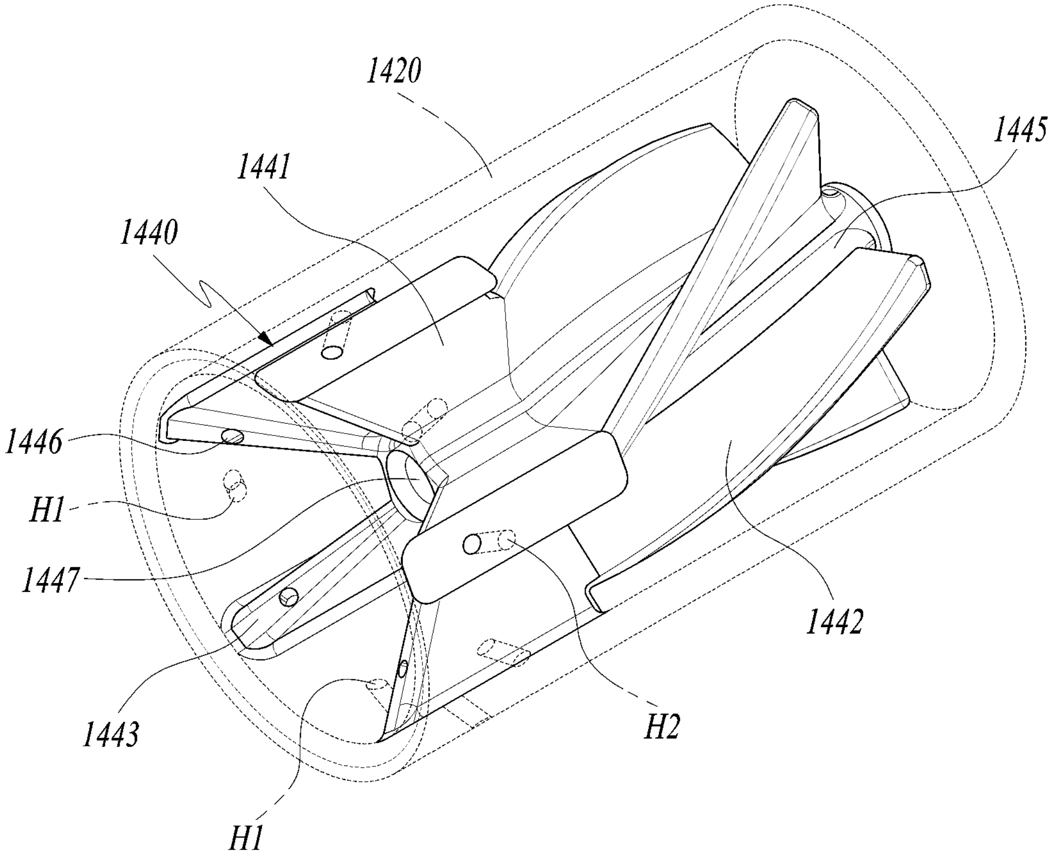
FIG. 9 is a perspective view illustrating an interior of a mixing tube according to a second embodiment of the present disclosure.

FIG. 9 is a perspective view illustrating an interior of the mixing tube according to the second embodiment of the present disclosure.

Referring to FIG. 9, since the nozzle according to the present embodiment has the same structure as the nozzle according to the first embodiment, except for the mixing tube 1420, a duplicate description of the same configuration will be omitted.

A mixing guide 1440 through which fuel is sprayed may be mounted inside the mixing tube 1420. The mixing guide 1440 may include a plurality of spray vanes 1441, a center support 1445 disposed at the center of the mixing tube 1420, and swirl vanes 1442 disposed at a downstream side of the spray vanes 1441 and connected to the spray vanes 1441 in a spiral direction.

A plurality of first spray holes H1 and a plurality of second spray hole H2 are formed in the mixing tube 1420, and the first spray hole H1 is configured to directly spray fuel into the inner portion of the mixing tube 1420. The first spray hole H1 may be formed between the spray vanes 1441.

The second spray hole H2 is connected to a vane spray hole 1446 that is formed in the spray vane 1441, and is configured to supply fuel to the spray vane 1441. An inclined surface 1443 inclined with respect to a radial direction of the mixing tube 1420 is formed on a portion of the spray vane 1441 facing the inlet port 1422, and the vane spray hole 1446 may be formed in the inclined surface 1443. In addition, a space in which fuel is accommodated may be formed inside the spray vane 1441. The vane spray hole 1446 may be configured to spray fuel in a direction opposite to an introduction direction of air. Accordingly, turbulence may be induced, so that fuel and air may be uniformly mixed with each other.

In addition, since the first spray hole H1 is configured to spray fuel from an inner wall of the mixing tube 1420 and the vane spray hole 1446 is configured to spray fuel from an inner side of the mixing tube 1420 in the radial direction, fuel is sprayed at a uniform flow rate in the radial direction of the mixing tube 1420, so that fuel and air may be uniformly mixed with each other in the mixing tube 1420.

The center support 1445 supports the spray vanes 1441 and the swirl vanes 1442, and may be formed in a tubular shape. A central passage 1447 through which air passes may be formed in the center support 1445. The swirl vanes 1442 are connected in the spiral direction and induce a rotational flow, and fuel and air may be uniformly mixed with each other by the rotational flow. The plurality of swirl vanes 1442 is fixed to the center support 1445 and the inner wall of the mixing tube 1420.

As in the embodiment, when the mixing guide 1440 is mounted inside the mixing tube 1420, air and fuel may be more uniformly mixed with each other in the mixing tube 1420.

Hereinafter, the nozzle according to a third embodiment of the present disclosure will be described.

Figure 10:
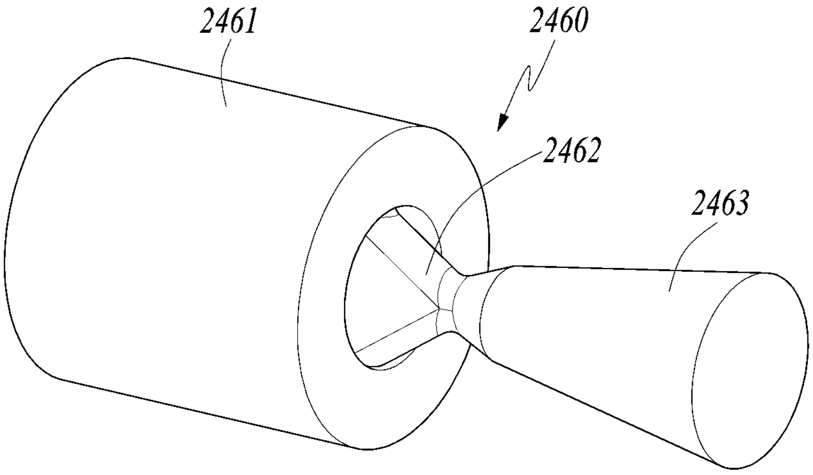
FIG. 10 is a perspective view illustrating the impact connector according to a third embodiment of the present disclosure.
Figure 11:
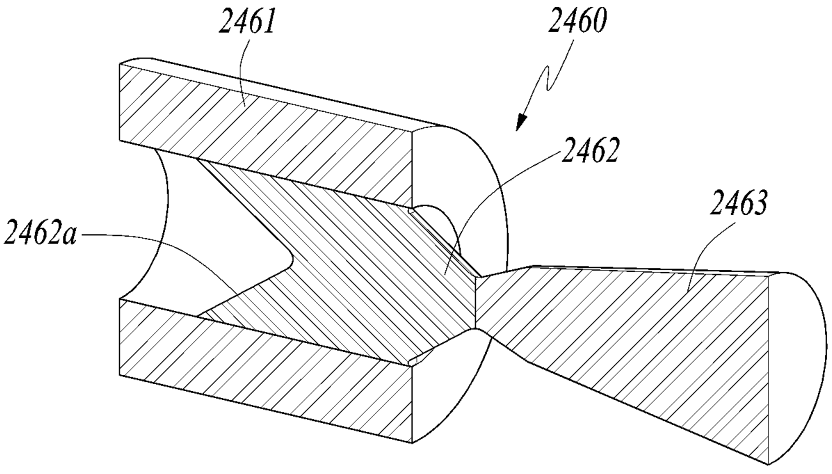
FIG. 11 is a cross-sectional view illustrating the impact connector according to the third embodiment of the present disclosure taken along in a longitudinal direction.

FIG. 10 is a perspective view illustrating the impact connector according to the third embodiment of the present disclosure, and FIG. 11 is a cross-sectional view illustrating the impact connector according to the third embodiment of the present disclosure taken along in a longitudinal direction.

The present embodiment will be described with reference to FIG. 10 and FIG. 11. Furthermore, since the nozzle according to the present embodiment has the same structure as the nozzle according to the first embodiment, except for an impact connector 2460, a duplicate description of the same configuration will be omitted.

The impact connector 2460 connects the front plate and the tip plate, and is configured to move fuel in the dispersion space to the cooling space. The fuel accommodated in the dispersion space may cool the tip plate through the impact connector 2460 while being moved to the cooling space.

The impact connector 2460 may include a connection tube 2461 coupled to the front plate 2460, a supporting protrusion 2462 that protrudes from the connection tube 2461, and a heat transfer support 2463 which protrudes from the supporting protrusion 2462 and which is in contact with a tip plate 2415. The connection tube 2461 may be formed in a cylindrical shape, or may be formed in a structure in which an inner diameter gradually decreases toward the tip plate 2415. The support protrusion 2462 is formed in a plate shape, and may divide a space inside the connection tube 2461 by being inserted into the inside of the connection tube 2461. The support protrusion 2462 may be formed in a flat plate shape, and a groove 2462*a* in which a center in a width direction thereof is recessed may be formed in an end portion of the support protrusion 2462 at an upstream side positioned inside the connection tube 2461. In addition, an end portion of the connection tube 2461 at a downstream side protruding from the connector 2461 may be formed such that a width of the end portion is gradually decreased toward the downstream side. The heat transfer support 2463 may be formed in a truncated cone shape in which an inner diameter gradually increases from the support protrusion 2462 to the tip plate 2415. During combustion, heat generated in the tip plate 2415 may be transferred to the support protrusion 2462 and the connection tube 2461 through the heat transfer support 2463, and the heat transfer support 2463 and the support protrusion 2462 may be cooled by fuel being sprayed. While one or more exemplary embodiments have been described with reference to the accompanying drawings, it will be apparent to those skilled in the art that various variations and modifications may be made by adding, changing, or removing components without departing from the spirit and scope of the present disclosure as defined in the appended claims, and these variations and modifications fall within the spirit and scope of the present disclosure as defined in the appended claims. In addition, it is noted that any one feature of an embodiment of the present disclosure described in the specification may be applied to another embodiment of the present disclosure.

What is claimed is:

1. A combustor nozzle that burns fuel containing hydrogen, the combustor nozzle comprising:

a plurality of mixing tubes through which air and fuel flow;

a multi-tube into which the plurality of mixing tubes are inserted, the multi-tube supporting the plurality of mixing tubes;

a fuel tube formed inside the multi-tube and through which fuel flows;

a tip plate coupled to a tip of the multi-tube;

a front plate spaced apart from the tip plate, the front plate forming a cooling space;

a dispersion plate spaced apart from the front plate and connected to the fuel tube, the dispersion plate forming a dispersion space in which fuel discharged from the fuel tube is diffused; and an impact connector mounted to the front plate, the impact connector connecting the dispersion space and the cooling space to each other to pass fuel from the dispersion space into the cooling space through the impact connector.

2. The combustor nozzle of claim 1, wherein the impact connector is configured to spray the fuel toward the tip plate such that the fuel impacts the tip plate.

3. The combustor nozzle of claim 2, wherein a first end portion of the impact connector is fixed to the tip plate, and a second end portion of the impact connector is fixed to the front plate.

4. The combustor nozzle of claim 3, wherein the impact connector comprises a connection tube coupled to the front plate, a support protrusion that protrudes from the connection tube, and a heat transfer support which protrudes from the support protrusion and which is in contact with the tip plate.

5. The combustor nozzle of claim 4, wherein the support protrusion comprises a plurality of support protrusions that protrudes from the connection tube, and the plurality of support protrusions is formed such that the plurality of support protrusions is inclined with respect to a longitudinal direction of the connection tube.

6. The combustor nozzle of claim 4, wherein the heat transfer support is formed in a truncated cone shape such that an inner diameter of the heat transfer support is increased from the support protrusion toward the tip plate.

7. The combustor nozzle of claim 4, wherein the support protrusion is formed in a plate shape, and is inserted into an inner portion of the connection tube, thereby dividing an inner space of the connection tube.

8. The combustor nozzle of claim 1, wherein a recessed portion which is concavely recessed and which forms a stabilizing space having a cone shape is formed in a center of the tip plate.

9. The combustor nozzle of claim 8, wherein a plurality of intermediate spray holes through which the fuel is sprayed is formed at a portion in the fuel tube positioned in the dispersion space.

10. The combustor nozzle of claim 9, wherein a tip spray portion which protrudes in a cone shape and which has a plurality of tip spray holes is formed on a tip of the fuel tube.

11. The combustor nozzle of claim 9, wherein a center spray plate which is inclined with respect to the front plate and which faces the recessed portion is formed in a center of the front plate, and a center hole through which the fuel is sprayed is formed in the center spray plate.

12. The combustor nozzle of claim 1, wherein the dispersion plate is formed such that the dispersion plate is inclined so that the dispersion plate protrudes rearward from a center of the dispersion plate in a radially outward direction.

13. A combustor comprising:

a burner having a plurality of nozzles configured to spray fuel and air; and a duct assembly which is coupled to a first side of the burner and in which the fuel and the air are burned, the duct assembly being configured to transfer combustion gas to a turbine, wherein each nozzle of the plurality of nozzles comprises:

a plurality of mixing tubes through which air and fuel flow;

a multi-tube into which the plurality of mixing tubes are inserted, the multi-tube supporting the plurality of mixing tubes;

a fuel tube formed inside the multi-tube and through which fuel flows;

a tip plate coupled to a tip of the multi-tube;

a front plate spaced apart from the tip plate, the front plate forming a cooling space;

a dispersion plate spaced apart from the front plate and connected to the fuel tube, the dispersion plate forming a dispersion space in which fuel discharged from the fuel tube is diffused; and an impact connector mounted to the front plate, the impact connector connecting the dispersion space and the cooling space to each other to pass fuel from the dispersion space into the cooling space through the impact connector.

14. The combustor of claim 13, wherein the impact connector is configured to spray the fuel toward the tip plate such that the fuel impacts the tip plate.

15. The combustor of claim 14, wherein the impact connector comprises a connection tube coupled to the front plate, a support protrusion that protrudes from the connection tube, and a heat transfer support which protrudes from the support protrusion and which is in contact with the tip plate.

16. The combustor of claim 13, wherein a plurality of intermediate spray holes through which the fuel is sprayed is formed at a portion in the fuel tube positioned in the dispersion space.

17. The combustor of claim 16, wherein a tip spray portion which protrudes in a cone shape and which has a plurality of tip spray holes is formed on a tip of the fuel tube.

18. A gas turbine comprising:

a compressor configured to compress air introduced from outside;

a combustor configured to mix fuel with air compressed from the compressor, the combustor being configured to burn a mixture of the fuel and the air; and a turbine that comprises a plurality of turbine blades configured to be rotated by combustion gas generated from the combustor, wherein the combustor comprises:

a burner having a plurality of nozzles configured to spray fuel and air; and a duct assembly which is coupled to a first side of the burner and in which the fuel and the air are burned, the duct assembly being configured to transfer the combustion gas to the turbine, and wherein each nozzle of the plurality of nozzles comprises:

a plurality of mixing tubes through which air and fuel flow;

a multi-tube into which the plurality of mixing tubes are inserted, the multi-tube supporting the plurality of mixing tubes;

a fuel tube formed inside the multi-tube and through which fuel flows;

a tip plate coupled to a tip of the multi-tube;

a front plate spaced apart from the tip plate, the front plate forming a cooling space;

a dispersion plate spaced apart from the front plate and connected to the fuel tube, the dispersion plate forming a dispersion space in which fuel discharged from the fuel tube is diffused; and an impact connector is mounted to the front plate, the impact connector connecting the dispersion space and the cooling space to each other to pass fuel from the dispersion space into the cooling space through the impact connector.

19. The gas turbine of claim 18, wherein the impact connector is configured to spray the fuel toward the tip plate such that the fuel impacts the tip plate.

20. The gas turbine of claim 19, wherein the impact connector comprises a connection tube coupled to the front plate, a support protrusion that protrudes from the connection tube, and a heat transfer support which protrudes from the support protrusion and which is in contact with the tip plate.

* * * * *